(12) United States Patent  
Chopra et al.

(10) Patent No.: US 8,741,044 B1  
(45) Date of Patent: *Jun. 3, 2014

(54) CYCYLOHEXYL-MANNITOL DIKETAL DERIVATIVES AS VEHICLE MODIFIERS AND GELATORS

(71) Applicant: Xerox Corporation, Norwalk, CT (US)

(72) Inventors: Naveen Chopra, Oakville (CA); Guerino Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/745,495

(22) Filed: Jan. 18, 2013

(51) Int. Cl.
*C09D 11/02* (2006.01)

(52) U.S. Cl.
USPC ..................... 106/31.29; 106/31.61

(58) Field of Classification Search
USPC .......................... 106/31.29, 31.61
See application file for complete search history.

(56) References Cited

U.S. PATENT DOCUMENTS

| | | |
|---|---|---|
| 5,195,430 A | 3/1993 | Rise |
| 5,231,135 A | 7/1993 | Machell et al. |
| 5,389,958 A | 2/1995 | Bui et al. |
| 5,621,022 A | 4/1997 | Jaeger et al. |
| 6,221,137 B1 | 4/2001 | King et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,427,323 B1 | 9/2008 | Birau et al. |

*Primary Examiner* — Veronica F Faison
(74) *Attorney, Agent, or Firm* — Pillsbury Winthrop Shaw Pittman LLP

(57) ABSTRACT

Disclosure herein are cycylhexyl-mannitol diketal derivatives as vehicle modifiers and gelators having a formula of:

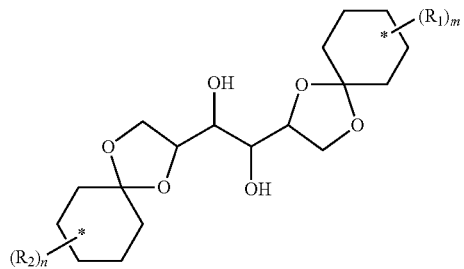

wherein each $R_1$ and $R_2$ is independently alkyl, aryl, arylalkyl, alkaryl, or halogen; m is from 1 to 10; and n is from 1 to 10.

20 Claims, 1 Drawing Sheet

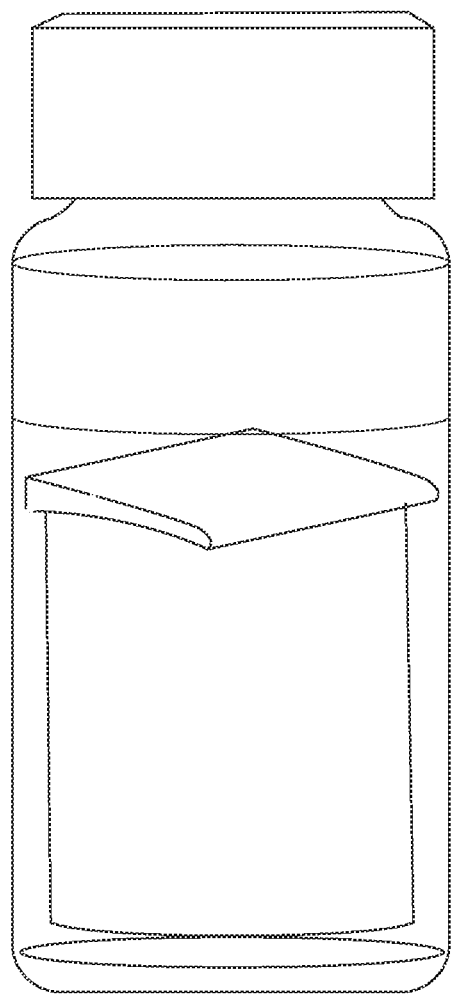

CYCYLOHEXYL-MANNITOL DIKETAL DERIVATIVES AS VEHICLE MODIFIERS AND GELATORS

BACKGROUND

Gelators have found uses in numerous industrial applications ranging from oil and gas, to inks, and to personal care products, such as makeup, creams and lotions. Provided herein are gelator materials that can be used for enhancing the properties of waxes, such as increasing the melting point and softening temperature of the waxes (i.e., temperature at which wax becomes transparent).

Most vehicles including waxes and hydrocarbons have low melting points ranging from 50° C. to 70° C. In various industrial applications, it is beneficial to incorporate vehicles having higher melting points. For Example, in ink jet printing of hot melt (phase-change) inks the phase-change inks contain a significant percentage of vehicles, e.g., waxes, that melt at a much higher melting points than the typical range of from 50° C. to 70° C., e.g., at 100° C. or higher, or at 120° C. or higher. Thus, there exists a need to enhance the properties of vehicles (e.g., waxes), particularly in phase-change inks, for improved robustness and modify their properties (e.g., melting points, dropping points and softening points).

Ink jet printing processes may employ inks that are solid at room temperature and liquid at elevated temperatures. Such inks may be referred to as solid inks, hot melt inks, phase change inks and the like. In ink jet printing processes employing hot melt inks, the solid ink is melted by the heater in the printing apparatus and utilized (jetted) as a liquid in a manner similar to that of conventional ink jet printing. Upon contact with the printing recording medium, the molten ink solidifies rapidly, allowing the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, reduced print-through, and enablement of indefinite periods of nonprinting without the danger of nozzle clogging, even without capping the nozzles.

SUMMARY

According to embodiments illustrated herein, there is provided a gelator having a formula of:

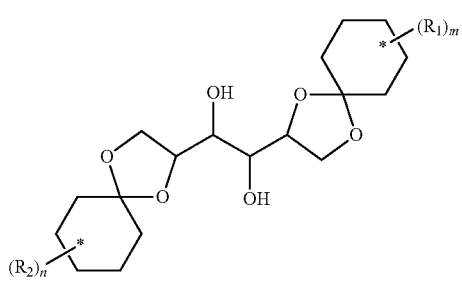

wherein each $R_1$ and $R_2$ is independently alkyl, aryl, arylalkyl, alkaryl, or halogen; m is from 1 to 10; and n is from 1 to 10.

In further embodiments, there is provided a gelator composition having a formula of:

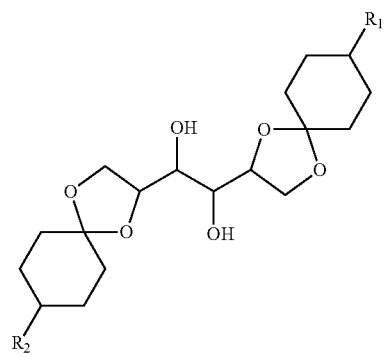

wherein $R_1$ and $R_2$ are both t-butyl or phenyl.

In certain embodiments, there is provided a phase change ink comprising:
a vehicle; and
a gelator having a formula of:

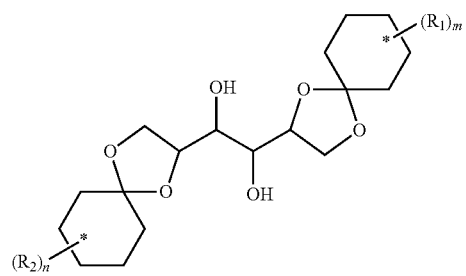

wherein each $R_1$ and $R_2$ is independently alkyl, aryl, arylalkyl, alkaryl, or halogen; m is from 1 to 5; and n is from 1 to 5.

BRIEF DESCRIPTION OF THE DRAWINGS

For a better understanding of the present embodiments, reference may be had to the accompanying FIGURE.

The FIGURE shows a gelator (1 wt percent) according to the present embodiments gelled in dodecane.

DETAILED DESCRIPTION

In the following description, it is understood that other embodiments may be utilized and structural and operational changes may be made without departure from the scope of the present embodiments disclosed herein.

Disclosed herein are cyclohexyl-mannitol diketal derivatives as vehicle modifiers and gelators. In particular, the disclosure provides vehicle modifiers (or gelators) having a formula of:

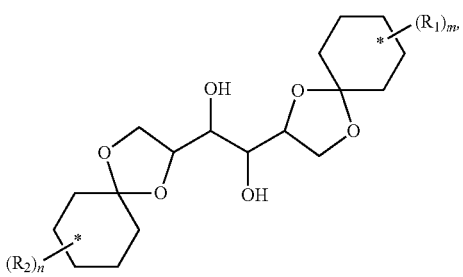

wherein each $R_1$ and $R_2$, independently of the other, can be (but is not limited to) (1) an alkyl group (including linear, branched, saturated, unsaturated, cyclic, unsubstituted, and substituted alkyl groups; (2) an aryl group (including unsubstituted and substituted aryl groups); (3) an arylalkyl group (including unsubstituted and substituted arylalkyl groups, or (4) an alkylaryl group (including unsubstituted and substituted alkylaryl groups, wherein the substituents on the substituted alkyl, aryl, arylalkyl, and alkylaryl groups can be (but are not limited to) hydroxy groups, halogen atoms, amine groups, ammonium groups, pyridine groups, pyridinium groups, phosphine groups, phosphonium groups, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azo groups, azide groups, cyanato groups, isocyanato groups, thiocyanato groups, isothiocyanato groups, mixtures thereof, or the like; or (4) a halogen, such as fluorine, chlorine, bromine or iodine; m is from 1 to 10; and n is from 1 to 10.

The term "alkyl," as used herein, alone or in combination, refers to a straight-chain or branched-chain alkyl radical containing from 1 to and 20, from 1 to 10, and or from 1 to 6 carbon atoms. Alkyl groups may be optionally substituted as defined herein. Examples of alkyl radicals include methyl, ethyl, n-propyl, isopropyl, n-butyl, isobutyl, sec-butyl, tert-butyl, pentyl, iso-amyl, hexyl, octyl, noyl and the like.

The term "aryl," as used herein, alone or in combination, refers to a carbocyclic aromatic system containing one, two or three rings wherein such rings may be attached together in a pendent manner or may be fused. The term "aryl" embraces aromatic radicals such as benzyl, phenyl, naphthyl, anthracenyl, phenanthryl, indanyl, indenyl, annulenyl, azulenyl, tetrahydronaphthyl, and biphenyl.

The term "arylalkyl," as used herein, alone or in combination, refers to an aryl group attached to the parent molecular moiety through an alkyl group.

The term "alkylaryl," as used, alone or in combination, denotes an alkyl group as defined herein, attached to an aryl group as defined herein. The alkylaryl group can be unsubstituted or substituted through available carbon atoms with one or more groups defined hereinabove for alkyl.

In certain embodiments, the disclosure provides a gelator where each $R_1$ and $R_2$ can be independently alkyl or aryl. In certain embodiments, the disclosure provides a gelator where each $R_1$ and $R_2$ can be independently methyl, ethyl, n-propyl, isopropyl, n-butyl, i-butyl, t-butyl, or optionally substituted phenyl. In one embodiment, each $R_1$ and $R_2$ are both t-butyl. In one embodiment, each $R_1$ and $R_2$ are both phenyl.

In certain embodiments, the disclosure provides a gelator where m can be 1, 2, or 3. In certain embodiments, the disclosure provides a gelator where n can be 1, 2, or 3. In certain embodiments, the disclosure provides a gelator where all the $R_1$ are the same. In certain embodiments, the disclosure provides a gelator where all the $R_2$ are the same. In certain embodiments, the disclosure provides a gelator where all the $R_1$ and $R_2$ are the same.

In certain embodiments, the disclosure provides a gelator where m equals to 1. In certain embodiments, the disclosure provides a gelator where n equals to 1. In further of such embodiments, $R_1$ and $R_2$ can each be attached to the carbon of the corresponding cyclohexane ring at the 2-, 3-, 4-, 5-, or 6-position.

In certain embodiments, the disclosure provides a gelator having a formula of:

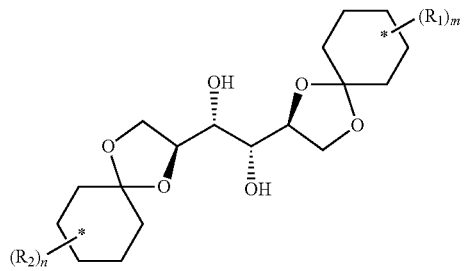

wherein $R_1$, $R_2$, m and n are the same as defined herein.

In one specific embodiment, the disclosure provides a gelator having a formula of:

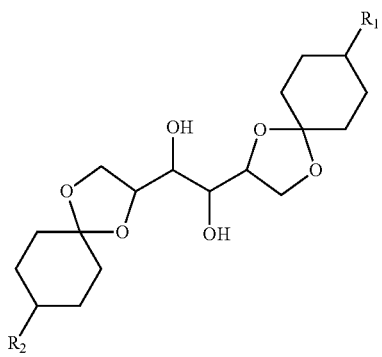

wherein $R_1$ and $R_2$ are the same as defined herein.

The present disclosure also provides a phase change ink including a vehicle; and a gelator (or a vehicle modifier) having a formula of:

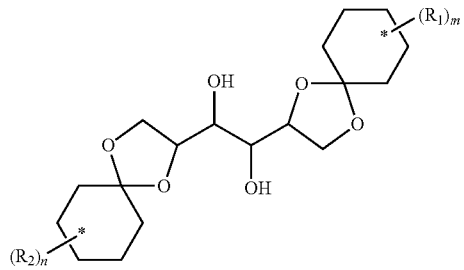

wherein each $R_1$ and $R_2$ is independently alkyl, aryl, arylalkyl, alkaryl, or halogen; m is from 1 to 5; and n is from 1 to 5. Each $R_1$, $R_2$, m and n are defined herein in various embodiments.

In the present embodiments, the gelator of the present disclosure helps to enhance the properties of the vehicle, such as, hydrocarbon or wax. For example, the gelator is capable of gelling various vehicles (e.g., hydrocarbons) such that gels or pastes can be prepared with a range of dropping points depending on gelator concentration. In general, a monotonic increase in dropping point can be observed with gelator concentrations. The gelators of the present disclosure are capable of forming gels in saturated hydrocarbons, such as hexane, dodecane, hexadecane and the like, exhibiting a dropping point of from about 40° C. to about 70° C., from about 50° C. to about 65° C., or from about 55° C. to about 60° C. with concentration ranges of from about 0.5 to about 10 weight percent, from about 0.75 to about 7.5 weight percent, from about 1 to about 5 weight percent, or from about 1 to about 3 weight percent of the vehicle.

The dropping point is a measure of the gelator's effectiveness as a thickener. The dropping point is the temperature at which a gel/paste/grease passes from a semi-solid to a liquid state under specific test conditions. It is an indication of the type of gelator (e.g., as a thickener) used, and a measure of the cohesiveness of the fluid and gelator. The test is described in American Society for Testing and Materials (ASTM) standards D-566 and D-2265. In general, the measurement is performed by using a small cup with a hole in the bottom, a block heater, and a thermometer. The gel is placed into the cup, and heated to the point at which it begins to flow through the hole at the bottom. It is commonplace in the field of gelators to interchangeably use the term 'melting point' and 'dropping point'.

The gelator may be present in the phase change ink in an amount of from about 0.25 percent to about 10 percent by weight, or from about 0.5 percent to about 7.5 percent by weight, or from about 2 percent to about 5 percent by weight of the total weight of the phase change ink.

In certain embodiments, the phase change ink may include one gelator of the present disclosure. In certain embodiments, the phase change ink may include more than one gelators of the present disclosure.

The gelators of the present disclosure may also function to increase the melting point and/or softening point of a wax within a desired temperature range. In particular, the gelator acts as a wax modifier in the phase change ink and enhances the properties of the wax in the ink carrier, by increasing the melting point and/or softening point of the wax.

Gelators of the present disclosure may be synthesized according to the following general reaction scheme:

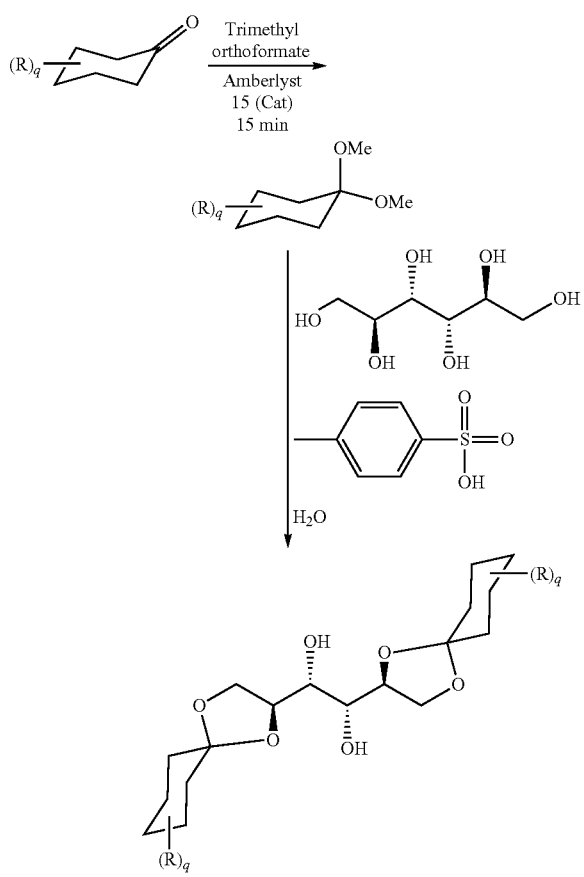

wherein each R can be alkyl, aryl, arylalkyl, alkaryl, or halogen; q is from 1 to 10.

The following scheme exemplifies where the R groups on each cyclohexyl ring are different R groups in different positions (4-methyl and 2-ethyl) on the ring, yielding a statistical mixture of three different products.

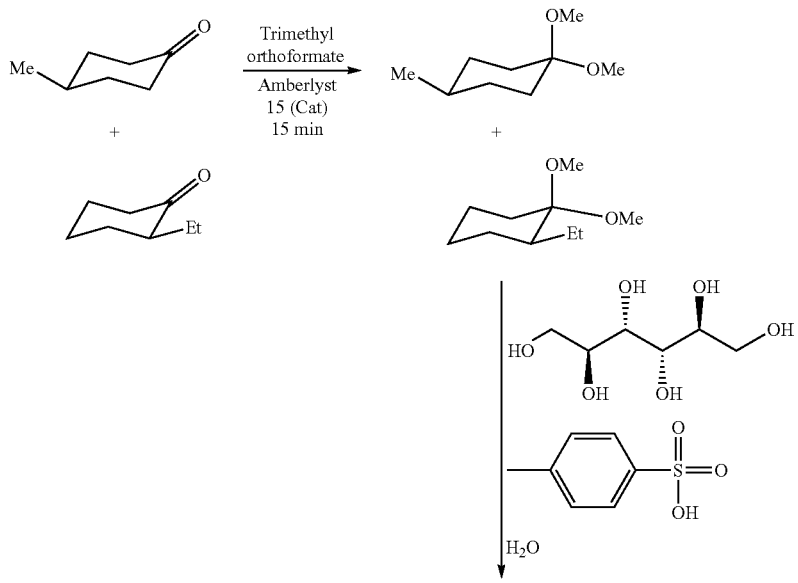

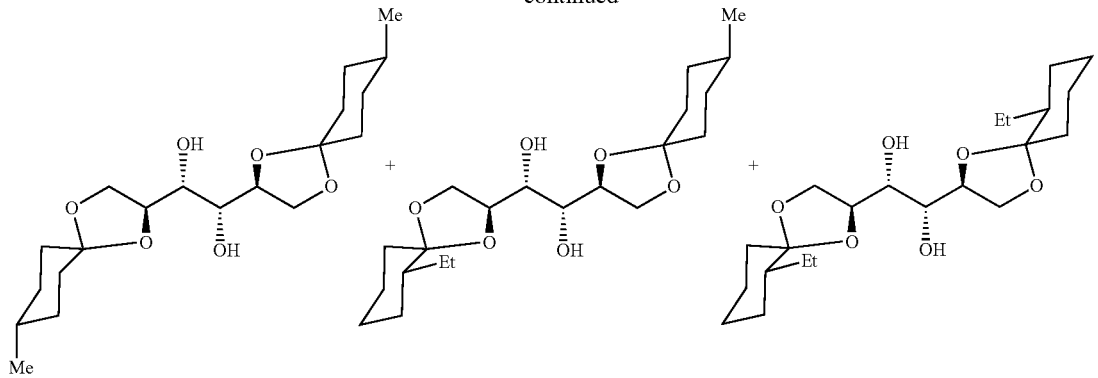

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from BASF); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HO (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The ink may also contain a pigment stabilizing surfactant or dispersant having portions or groups that have an excellent adsorption affinity for the various pigments used in the colored inks of the ink set, and also having portions or groups that allow for dispersion within the ink vehicle are desired. Selection of an appropriate dispersant for all of the colored inks of the ink set may require trial and error evaluation, capable by those of ordinary skill in the art, due to the unpredictable nature of dispersant/pigment combinations.

As example dispersants, random and block copolymers may be suitable. A particularly desirable block copolymer is an amino acrylate block copolymer, for example including an amino or amino acrylate block A and an acrylate block B, the acrylate portions permitting the dispersant to be stably and well dispersed in the ink vehicle while the amino portions adsorb well to pigment surfaces. Commercially available examples of block copolymer dispersants that have been found suitable for use herein are DISPERBYK-2001 (BYK Chemie GmbH) and EFKA 4340 (Ciba Specialty Chemicals).

The colorant may be included in the ink composition in an amount of from, for example, about 0.1 to about 15% by weight of the ink composition, such as about 2.0 to about 9% by weight of the ink composition.

Optional Additives

The ink vehicle of one or more inks of the ink set may contain additional optional additives. Optional additives may include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like.

The inks may include, as a stabilizer, a radical scavenger, such as IRGASTAB UV 10 (BASF). The inks may also include an inhibitor, such as a hydroquinone or monomethylether hydroquinone (MEHQ), to stabilize the composition by prohibiting or, at least, delaying, polymerization of the oligomer and monomer components during storage, thus increasing the shelf life of the composition.

The ink may optionally contain antioxidants to protect the images from oxidation and also may protect the ink components from oxidation while existing as a heated melt in the ink reservoir. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from BASF; GENORAD 16 and GENORAD 40 commercially available from Rahn AG, Zurich, Switzerland, and the like. When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

The phase change inks are solid or solid-like at room temperature. It is desired for the phase change inks to have a viscosity of less than about 30 mPas, such as less than about 20 mPas, for example from about 3 to about 20 mPas, from about 5 to about 20 mPas or from about 8 to about 15 mPas, at the temperature of jetting of the ink. Thus, the inks are jetted in a liquid state, which is achieved by applying heat to melt the ink prior to jetting. The inks are desirably jetted at low temperatures, in particular at temperatures below about 120° C., for example from about 50° C. to about 110° C. or from about 60° C. to about 100° C. or from about 70° C. to about 90° C. The inks are thus ideally suited for use in piezoelectric ink jet devices.

The ink compositions can be prepared by any desired or suitable method. For example, each of the components of the ink carrier can be mixed together, followed by heating, the mixture to at least its melting point, for example from about 60° C. to about 120° C., 80° C. to about 110° C., 85° C. to about 100° C. or about 85° C. to about 95° C. The colorant may be added before the ink ingredients have been heated or after the ink ingredients have been heated. The heated mixture is then stirred for about 5 seconds to about 10 minutes or more, to obtain a substantially homogeneous, uniform melt, followed by cooling the ink to ambient temperature (typically from about 20° C. to about 25° C.). The inks are gels at ambient temperature. The inks can be employed in apparatus for direct printing ink jet processes. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUS- TROGLOSS, specialty papers such as Xerox DURAPAPER, and the like, transparency materials, fabrics, textile products, plastics, polymeric films, inorganic recording mediums such as metals and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of 1,1'-dimethoxycyclohexane

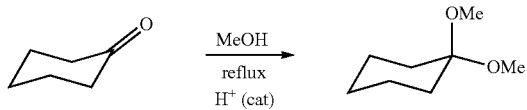 [SMILES: "MeOH" ; O=C1CCCCC1 ; COC1(OC)CCCCC1]

To a 250 mL 3-necked round-bottomed flask fitted with a reflux condenser is added cyclohexanone (25 mL, 241 mmol), followed by MeOH (100 mL) with stirring. pTsOH (1.046 g, 5.5 mmol) is subsequently added, and the mixture is stirred with heating to 60° C. until the mixture becomes homogeneous and all components were dissolved. After 2 hours of reaction time, a $^1$H NMR is taken of the reaction mixture to monitor the degree of reaction and composition of the mixture. The reaction is fitted with a vacuum distillation apparatus, and water is added to obtain an approximate ratio of 55% water and 45% unreacted cyclohexanone. Next, vacuum is applied and the MeOH was distilled off, followed by the azeotropic mixture of water and unreacted cyclohexanone. Finally, the temperature is raised to 100° C. and the desired product 1,1'-dimethoxy cyclohexane is distilled off.

Example 2

Preparation of 4-substituted 1,1'-dimethoxy cyclohexane Derivatives

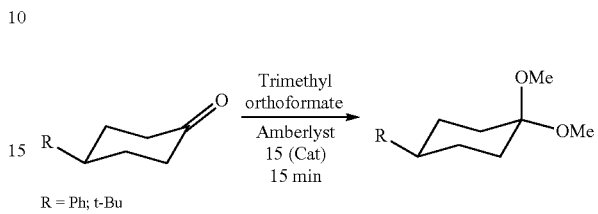

R = Ph; t-Bu a) (R=Ph); To a 250 mL 3-necked round-bottomed flask was added 4-phenyl-cyclohexanone (25 g, 162 mmol), trimethyl orthoformate (25 grams), 50 grams of dichloromethane and Amberlyst-15 with stirring. The reaction was stirred for 30 minutes stirred with heating to 45° C. Next, the reaction mixture was transferred to a separator funnel and the organic layer was shaken with a 5% aqueous sodium bicarbonate solution, followed by brine. The organic layer was isolated, dried with MgSO$_4$, and evaporated under reduced pressure to furnish 1,1'-dimethoxy-4-phenyl-cyclohexane as a solid. The product 1,1'-dimethoxy-4-phenyl-cyclohexane was determined to be >99% purity by NMR. Dissolution of the product 1,1'-dimethoxy-4-phenyl-cyclohexane in hexane, followed by refrigeration for several hours, resulted with colorless crystals which was filtered off and dried under vacuum. The pure crystals displayed a melting point of 67° C.

b) (R=t-Bu); To a 250 mL 3-necked round-bottomed flask was added 4-t-butyl-cyclohexanone (25 g, 162 mmol), trimethyl orthoformate (25 grams), 50 grams of dichloromethane and Amberlyst-15 with stirring. The reaction was stirred for 30 minutes with heating to 45° C. Next, the reaction mixture was transferred to a separator funnel and the organic layer was shaken with a 5% aqueous sodium bicarbonate solution, followed by brine. The organic layer was isolated, dried with MgSO$_4$, and evaporated under reduced pressure to furnish 1,1'-dimethoxy-4-tbutyl-cyclohexane as a pale yellow liquid. The product 1,1'-dimethoxy-4-tbutyl-cyclohexane is >99% purity by NMR.

Example 3

Preparation of Gelator from Example 1

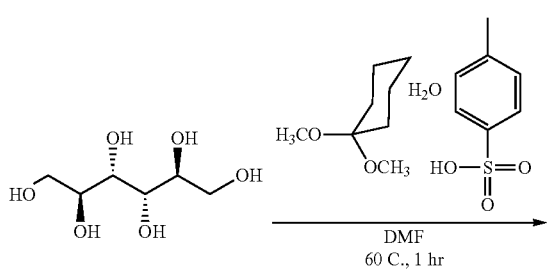

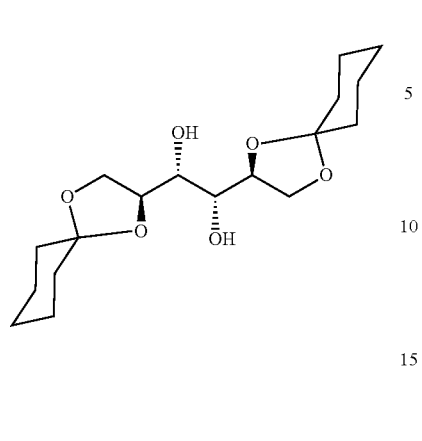

To a 2L 3-necked round-bottomed flask was added D-mannitol (60 g, 329 mmol), followed by DMF (500 mL) with stirring. pTsOH (1.046 g, 5.5 mmol) was subsequently added, and the mixture was stirred with heating until the mixture became homogeneous and all components were dissolved. Then, 1,1-dimethoxycyclohexane (101 ml, 675 mmol) was added to the homogeneous mixture. The reaction mixture was stirred for 1 hour at 60° C. The reaction mixture appeared as a clear golden solution. The reaction mixture was removed from heat and then attached to a short-path vacuum distillation apparatus to remove DMF. The resulting mixture was heated to 110° C. Viscous syrup was observed. 500 mL of ethyl acetate was added to dilute the concentrate which gave a cloudy golden suspension. NaHCO$_3$ was added to give a clear biphasic mixture. The mixture was washed with ethyl acetate and brine, and then dried with MgSO$_4$ and evaporated under reduced pressure to obtain a viscous gel, dicyclohexylacetal-mannitol gellant (107.75 g, 315 mmol, 96% yield), which was isolated as a brittle, golden solid.

Example 4

Preparation of Gelator from Example 2

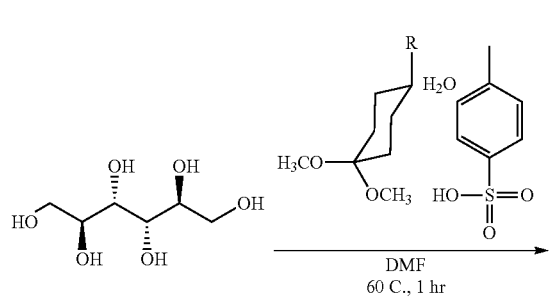

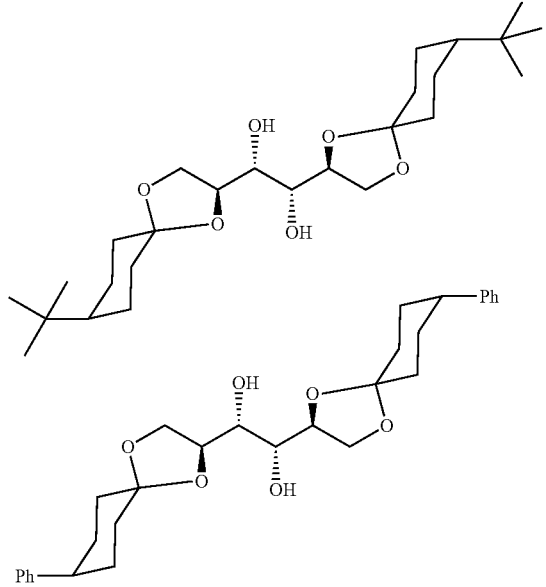

The gelators listed in the above scheme were prepared in the same manner as Example 3, except that 1,1'-dimethoxycyclohexane was substituted with 1,-1'-dimethoxy-4-tBu cyclohexane (R=4-tBu), or 1,1'-dimethoxycyclohexane was substituted with 1,-1'-dimethoxy-4-phenyl cyclohexane (R=Ph).

Example 5

Preparation of Gelator Gel 100 mg of gelator prepared in Example 3 was dissolved in 10 mL of dodecane solvent at 100° C. The resulting clear solution was allowed to cool to room temperature, forming a soft, free-standing clear gel.

Example 6

Dropping Point Test

The hydrocarbon fluids were tested using the method described in ASTM D-566 dropping point test. Table 1 summarizes the dropping point results for cyclohexane-mannitol gelator in C$_6$ (hexane), C$_{12}$ (dodecane), and C$_{16}$ (hexadecane) hydrocarbon fluids at 1, 3, and 5 weight % gelator loadings.

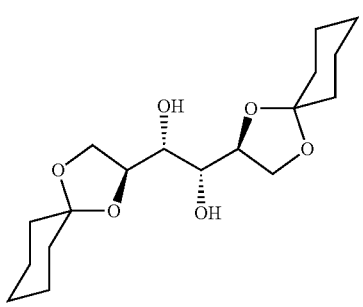 [SMILES: O[C@H]([C@@H](O)[C@@H]1COC2(CCCCC2)O1)[C@@H]1COC2(CCCCC2)O1]

cyclohexane-mannitol gelator

TABLE 1

Summary of Dropping Point Measurements for cyclohexane-mannitol gelator in C6, C12, and C16 hydrocarbon fluids

| Fluids | % Gelator | Dropping point/° C. |
|---|---|---|
| hexane ($C_6$) | 1% | Does not form a gel |
|  | 3% | 64.4 |
|  | 5% | 48.6 |
| dodecane ($C_{12}$) | 1% | 49.2 |
|  | 3% | 62.5 |
|  | 5% | 65.9 |
| hexadecane ($C_{16}$) | 1% | 50.3 |
|  | 3% | 65.9 |
|  | 5% | 70 |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A gelator having a formula of:

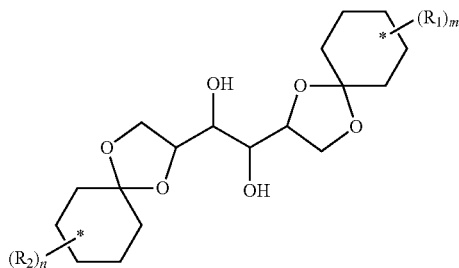

wherein each $R_1$ and $R_2$ is independently alkyl, aryl, arylalkyl, alkaryl, or halogen; m is from 1 to 10; and n is from 1 to 10.

2. The gelator of claim 1, wherein each $R_1$ and $R_2$ is independently alkyl or aryl.

3. The gelator of claim 1, wherein each $R_1$ and $R_2$ is independently methyl, ethyl, n-propyl, isopropyl, n-butyl, i-butyl, t-butyl, or optionally substituted phenyl.

4. The gelator of claim 1, wherein m is 1 and n is 1.

5. The gelator of claim 4, wherein $R_1$ and $R_2$ are not the same.

6. The gelator of claim 4, wherein $R_1$ and $R_2$ are the same.

7. The gelator of claim 4, wherein $R_1$ and $R_2$ are both t-butyl or phenyl.

8. The gelator of claim 4, wherein $R_1$ and $R_2$ are each attached to the carbon of the corresponding cyclohexane ring at the 4 position.

9. The gelator of claim 1 having a formula of:

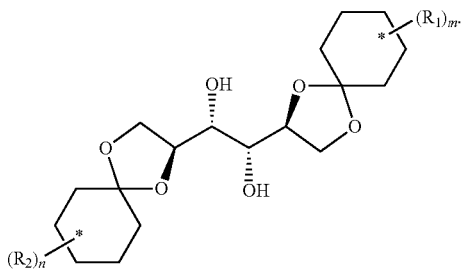

10. A gelator having a formula of:

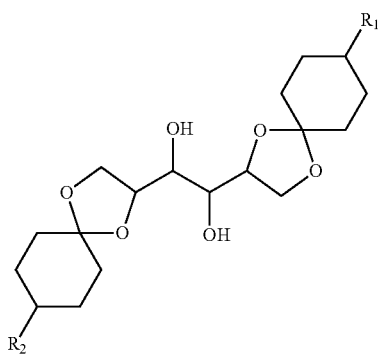

wherein $R_1$ and $R_2$ are both t-butyl or phenyl.

11. A phase change ink comprising:
a vehicle; and
a gelator having a formula of:

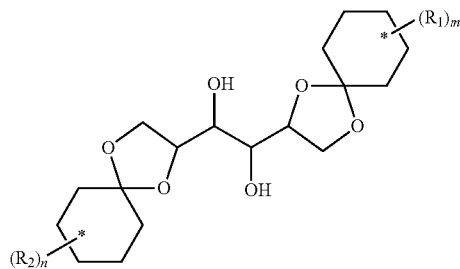

wherein each $R_1$ and $R_2$ is independently alkyl, aryl, arylalkyl, alkaryl, or halogen; m is from 1 to 5; and n is from 1 to 5.

12. The phase change ink of claim 11, wherein each $R_1$ and $R_2$ is independently alkyl or aryl.

13. The phase change ink of claim 11, wherein each $R_1$ and $R_2$ is independently methyl, ethyl, n-propyl, isopropyl, n-butyl, i-butyl, t-butyl, or optionally substituted phenyl.

14. The phase change ink of claim 11, wherein m is 1 and n is 1.

15. The phase change ink of claim 13, wherein $R_1$ and $R_2$ are both t-butyl.

16. The phase change ink of claim 13, wherein $R_1$ and $R_2$ are both phenyl.

17. The phase change ink of claim 13, wherein $R_1$ and $R_2$ are each attached to the carbon of the corresponding cyclohexane ring at the 4 position.

18. The phase change ink of claim 11, wherein the gelator having a formula of:

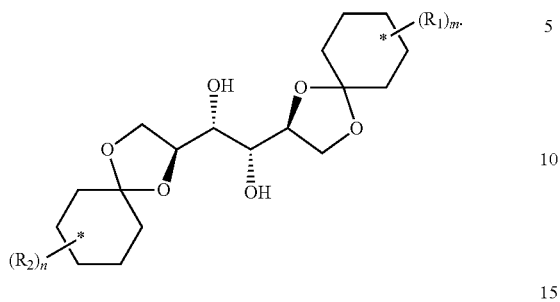

19. The phase change ink of claim 11, wherein the gelator is present in an amount of from about 0.25 percent to about 10 percent by weight of the total weight of the phase change ink.

20. The phase change ink of claim 11, wherein the gelator is capable of forming gels with dropping points from about 40° C. to about 70° C. at a concentration of from about weight percent 0.5 to about 10 weight percent of the vehicle.

* * * * *